(12) United States Patent
De Wit et al.

(10) Patent No.: US 10,097,333 B2
(45) Date of Patent: Oct. 9, 2018

(54) RADIO COMPRESSION MEMORY ALLOCATION

(71) Applicant: TELEFONAKTIEBOLAGET LM ERICSSON (PUBL), Stockholm (SE)

(72) Inventors: Erik De Wit, Rimbo (SE); Gertie Alsenmyr, Vallentuna (SE); Fredrik Persson, Märsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 15/115,124

(22) PCT Filed: Jan. 23, 2015

(86) PCT No.: PCT/SE2015/050066
§ 371 (c)(1),
(2) Date: Jul. 28, 2016

(87) PCT Pub. No.: WO2015/115968
PCT Pub. Date: Aug. 6, 2015

(65) Prior Publication Data
US 2016/0352492 A1 Dec. 1, 2016

Related U.S. Application Data

(60) Provisional application No. 61/934,002, filed on Jan. 31, 2014.

(51) Int. Cl.
*H04L 5/00* (2006.01)
*H04W 24/08* (2009.01)
(Continued)

(52) U.S. Cl.
CPC ........... *H04L 5/0064* (2013.01); *H04B 1/662* (2013.01); *H04W 24/08* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 2003/0030575 A1 | 2/2003 | Frachtenberg et al. | |
| 2004/0008650 A1 | 1/2004 | Le et al. | |
| 2005/0185677 A1* | 8/2005 | Christoffersson | H03M 7/30 370/521 |

FOREIGN PATENT DOCUMENTS

WO 2004017578 A1 2/2004

OTHER PUBLICATIONS

Nanba, et al., A New IQ Data Compression Scheme for Front-haul Link in Centralized RAN, 2013 IEEE 24th International Symposium on Personal, Indoor and Mobile Radio Communications: Workshop on Cooperative and Heterogeneous Cellular Networks, pp. 210-214, Sep. 8, 2013.

* cited by examiner

*Primary Examiner* — Christopher Crutchfield
*Assistant Examiner* — Alan Lindenbaum
(74) *Attorney, Agent, or Firm* — Sage Patent Group

(57) ABSTRACT

A method performed by a traffic analyzing element in a communication network in which a radio device communicates over a packet switched (PS) radio access bearer (RAB) with a radio access network (RAN) using compression in uplink (UL). The method comprises measuring at least one property of radio traffic between the radio device and the RAN. The method also comprises predicting a fraction of UL data on the PS RAB which will be compressible, based on the measuring. The method also comprises outputting information about the predicted fraction to a memory size estimating element in the communication network. Related
(Continued)

are a method performed by a memory size estimating element, as well as to a memory size estimating element and a traffic analyzing element.

12 Claims, 4 Drawing Sheets

(51) Int. Cl.
*H04B 1/66* (2006.01)
*H04W 28/06* (2009.01)

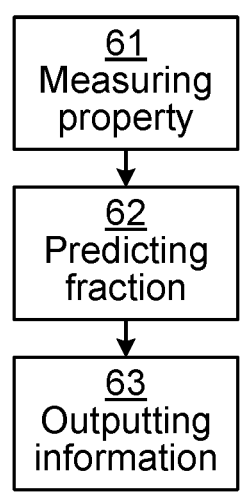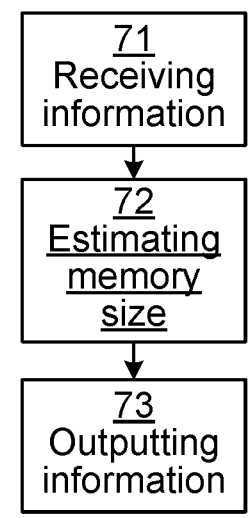
Fig. 6                    Fig. 7

RADIO COMPRESSION MEMORY ALLOCATION

This application is a 371 of International Application No. PCT/SE2015/050066, filed Jan. 23, 2015, which claims the benefit of U.S. Application No. 61/934,002, filed Jan. 31, 2014, the disclosures of which are fully incorporated herein by reference.

TECHNICAL FIELD

The present disclosure relates to methods and devices for improving allocation of memory sizes to compressor and de-compressor in uplink (UL) or downlink (DL) radio communication.

BACKGROUND

Data can be compressed in a radio communication between a user equipment (UE) and the radio access network (RAN), e.g. the radio network controller (RNC). In UL a compressor is then located in the UE and a de-compressor is located in the RAN. Similarly, in DL, a compressor is located in the RAN and a de-compressor is located in the UE.

However, compression requires memory resources in both the UE and the RAN node, which may be a limiting resource, especially in the RAN node if there are many UEs connected to it at the same time. A trade-off between optimal compression gain and allocation of available memory resources may be required.

SUMMARY

It is an objective of the present disclosure to improve how to decide the memory size allocated for compressor and de-compressor in communication between a radio device and a RAN over an air interface in a communication network.

According to an aspect of the present disclosure, there is provided a method performed by a traffic analyzing element in a communication network in which a radio device communicates over a packet switched (PS) radio access bearer (RAB) with a RAN using compression in UL. The method comprises measuring at least one property of radio traffic between the radio device and the RAN. The method also comprises predicting a fraction of UL data on the PS RAB which will be compressible, based on the measuring. The method also comprises outputting information about the predicted fraction to a memory size estimating element in the communication network.

According to another aspect of the present disclosure, there is provided a traffic analyzing element for a communication network in which a radio device communicates over a PS RAB with a RAN using compression in UL. The traffic analyzing element comprises processor circuitry, and a storage unit storing instructions that, when executed by the processor circuitry, cause the traffic analyzing element to measure at least one property of radio traffic between the radio device and the RAN. The instructions also cause the traffic analyzing element to predict a fraction of UL data on the PS RAB which will be compressible, based on the measuring. The instructions also cause the traffic analyzing element to output information about the predicted fraction to a memory size estimating element in the communication network.

According to another aspect of the present disclosure, there is provided a method performed by a memory size estimating element in a communication network in which a radio device communicates over a PS RAB with a RAN using compression in UL. The method comprises receiving, from a traffic analyzing element in the communication network, information about a predicted fraction of UL data on the PS RAB which will be compressible. The method also comprises estimating a memory size of a compressor memory and a de-compressor memory for storing past UL data packets transmitted over the PS RAB, based on the received information. The method also comprises outputting information about the estimated memory size to the compressor and to the de-compressor. Thereby, the compressor and de-compressor may be allowed to adjust their respective memory sizes to the estimated memory size.

According to another aspect of the present disclosure, there is provided a memory size estimating element for a communication network in which a radio device communicates over a PS RAB with a RAN using compression in UL. The memory size estimating element comprises processor circuitry, and a storage unit storing instructions that, when executed by the processor circuitry, cause the memory size estimating element to receive, from a traffic analyzing element in the communication network, information about a predicted fraction of UL data on the PS RAB which will be compressible. The instructions also cause the memory size estimating element to estimate a memory size of a compressor memory and a de-compressor memory for storing past UL data packets transmitted over the PS RAB, based on the received information. The instructions also cause the memory size estimating element to output information about the estimated memory size to the compressor and to the de-compressor. Thereby, the compressor and de-compressor may be allowed to adjust their respective memory sizes to the estimated memory size.

According to another aspect of the present disclosure, there is provided a computer program product comprising computer-executable components for causing a traffic analyzing element to perform an embodiment of a method of the present disclosure when the computer-executable components are run on processor circuitry comprised in the traffic analyzing element.

According to another aspect of the present disclosure, there is provided a computer program product comprising computer-executable components for causing a memory size estimating element to perform an embodiment of a method of the present disclosure when the computer-executable components are run on processor circuitry comprised in the memory size estimating element.

According to another aspect of the present disclosure, there is provided a computer program comprising computer program code which is able to, when run on processor circuitry of a traffic analyzing element, cause the traffic analyzing element to perform an embodiment of a method of the present disclosure. Thus, there is provided a computer program comprising computer program code which is able to, when run on processor circuitry of a traffic analyzing element in a communication network, cause the traffic analyzing element to measure at least one property of radio traffic between a radio device and a RAN in the communication network. The code is also able to cause the traffic analyzing element to predict a fraction of UL data on a PS RAB, over which the radio device communicates with the RAN, which will be compressible, based on the measuring. The code is also able to cause the traffic analyzing element to output information about the predicted fraction to a memory size estimating element in the communication network.

According to another aspect of the present disclosure, there is provided a computer program comprising computer program code which is able to, when run on processor circuitry of a memory size estimating element, cause the memory size estimating element to perform an embodiment of a method of the present disclosure. Thus, there is provided a computer program comprising computer program code which is able to, when run on processor circuitry of a memory size estimating element in a communication network, cause the memory size estimating element to receive, from a traffic analyzing element in the communication network, information about a predicted fraction of UL data on a PS RAB, over which a radio device communicates with a RAN in the communication network, which will be compressible. The code is also able to cause the memory size estimating element to estimate a memory size of a compressor memory and a de-compressor memory for storing past UL data packets transmitted over the PS RAB, based on the received information. The code is also able to cause the memory size estimating element to output information about the estimated memory size to the compressor and to the de-compressor. Thereby, the compressor and de-compressor may be allowed to adjust their respective memory sizes to the estimated memory size.

According to another aspect of the present disclosure, there is provided a computer program product comprising an embodiment of a computer program of the present disclosure and a computer readable means on which the computer program is stored.

Other aspects of the present disclosure are as the aspects presented above but relate to compression used in the DL instead of in the UL.

The at least one property of the radio traffic may e.g. be one or more of: data volume, transport protocol used, application layer protocol used, service type or media type, in UL or DL, for real-time or historical mobile radio traffic, and a property of the application layer signaling. In some embodiments, the property may be measured in DL for estimating a number of expected UL packets with an acknowledgement, e.g. Transmission Control Protocol (TCP) acknowledgement, in e.g. a future time frame of the PS RAB communication. Thus, according to some embodiments, the at least one property may be obtained by looking at the application signaling to predict what traffic will flow on the bearer that is set up (or in many cases rather at the TCP/User Datagram Protocol (UDP) connection being set up, running over the RAB that may already have established).

The fraction may be a fraction of the UL data having compressible payload and/or UL data having compressible header.

The estimating a memory size may comprise a trade-off between the highest compression gain obtainable and the availability of memory resources for the compressor and de-compressor.

The traffic analyzing element may be comprised in the radio device in the communication network, and may e.g. be embodied in processor circuitry in the radio device by the processor circuitry running software stored in a storage in the radio device. Alternatively, the traffic analyzing element may be comprised in the RAN.

The memory size estimating element may be comprised in the RAN, such as in or otherwise associated with an RNC of a RAN e.g. in accordance with a Wideband Code Division Multiple Access (WCDMA) standard, or in or otherwise associated with an evolved Node B (eNB) of a RAN in accordance with Long Term Evolution (LTE). Alternatively, the memory size estimating element may be comprised in the radio device.

In accordance with the present disclosure, a size of the memory of past packets may be determined in real time. The size of the compressor and de-compressor memory can be adapted in the RAN and radio device in real time, throughout the lifetime of the PS RAB so that it may have a convenient size to obtain higher compression gain. The type and/or volume of data traffic in DL and/or UL may be analyzed to determine a convenient memory size for past packets to be used by the compressor and de-compressor. A convenient memory size for past packets may be needed to obtain the higher compression gain for UL data.

Depending on the volume and the type of data traffic that the radio device receives in DL and sends in UL, there is a different demand on the size of the compressor and de-compressor memory of past packets that is needed to reach higher or maximum compression gain. The size of the compressor and de-compressor memory may thus in accordance with the present disclosure determined dynamically based on the real-time need, in order to obtain the higher or maximum compression gain.

The size of the compressor and de-compressor memory of past packets may thus be adapted during the time the compression feature is activated on the PS RAB. At a certain time there may be a need for a larger memory size to still reach maximum compression gain, while at some other (later) time, the larger memory size allocated could be reduced while still allowing to maintain the maximum compression gain. The memory resources that are then de-allocated may be used for other purpose in the RNC/eNB and the radio device.

The real-time memory size need may be determined from analyzing the type and/or volume of data traffic in DL and/or UL.

Embodiments of the present disclosure are able to dynamically adapt the size of the compressor and de-compressor memory of past (e.g. previously transmitted packets) packets based on the real-time need. The real-time need may be determined from analyzing the type of data traffic in DL and/or UL and the volume of data. At a certain moment there may be a need for a larger memory size to still reach adequate/maximum compression gain, while at some point later the larger memory size allocated could be reduced while still being able to maintain the adequate/maximum compression gain. The memory that is then de-allocated may be used for other purpose in the RAN and the radio device. Memory may be a shared resource in the RAN and the radio device. Embodiments of the present disclosure may enables management of the memory utilization in a controlled and efficient way.

It is to be noted that any feature of any of the aspects of the present disclosure may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 6 is a schematic flow chart of an embodiment of a method in accordance with the present disclosure.

FIG. 7 is a schematic flow chart of another embodiment of a method in accordance with the present disclosure.

DETAILED DESCRIPTION

Figure 1:
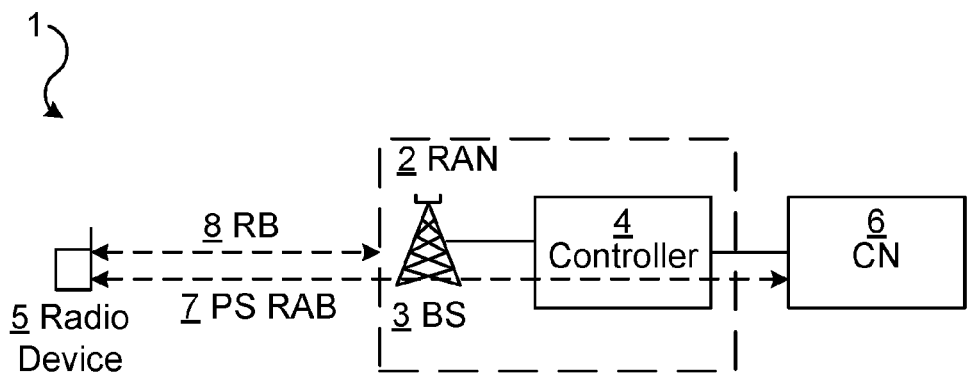
FIG. 1 is a schematic block diagram of an embodiment of a communication network in accordance with the present disclosure.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The present disclosure relates to using compression for UL and/or DL transmissions in a radio communication over an air interface. Compression is a function which can be applied in The Universal Mobile Telecommunications System (UMTS) and WCMDA, as well as in LTE, used for UL or DL internet protocol (IP) level payload and header compression.

Means for compression may comprise a compressor and a de-compressor function/module. Each of the compressor and de-compressor has a memory for storing past packets. The respective memories may be maintained in synch between compressor and de-compressor. In WCDMA, the compressor may be implemented in the radio device (e.g. UE) and the de-compressor may be implemented in the radio network controller (RNC), for UL compression, while the compressor may be in the RNC and the de-compressor in the radio device for DL compression.

A principle of compression is to compress original packets (to be transmitted over radio) into compressed packets, sending the compressed packets on the UL or DL air interface and de-compressing the compressed packets to reconstruct the original packets. The memory of past packets in the compressor is used to replace parts of an original packet with metadata that together with uncompressed bytes of the original packet makes up the compressed packet. The memory of past packets in the de-compressor is used together with the metadata in the compressed packet to reconstruct the original packet. A memory of past packets may exist per packet switched (PS) radio access bearer (RAB) in RAN (e.g. RNC or eNB) and radio device.

The compressor may use its memory of past packets to try to match one or more parts of the original packet to the data in the memory. If a match is found, the match, representing a string of data, will be replaced by metadata in the compressed packet. The metadata may be part of the compressed packet header. A compressed packet may thus comprise a compressed packet header with metadata and a payload of uncompressed data. Before sending the compressed packet, the compressor may push the original packet into its memory of past packets.

The compressed packet may be sent to the de-compressor. The de-compressor may use the metadata in the header of the compressed packet to reconstruct the original packet. The de-compressor may fetch the strings of data from its memory of past packets and insert this information at the correct locations in the compressed packet, thereby reconstructing the original packet. When the original packet has been reconstructed, it may be pushed into the memory of past packets of the de-compressor.

There may exist a compressor and de-compressor per PS RAB. There may be a memory of past packets in or otherwise associated with each compressor and de-compressor entity.

There may be a need to decide on the size of the compressor and de-compressor memories to use. It may be convenient to find an adequate trade-off between (mainly) RAN memory efficiency and compression efficiency. Especially the RAN node may have a limited total memory available, and with hundreds of thousands of connected radio devices there may be a desire to keep down the memory size per radio device. On the other hand, with a larger memory the chance for a hit when comparing the packets to be transmitted with the stored past packets increases, leading to an increased compression ratio.

The compressor and de-compressor memory may be limited to a fixed size, e.g. 2048, 4096, 8192 or 16384 bytes, in the RAN node, and also in the radio device if the memory sizes are synced. However, the size of the compressor and de-compressor memory may be decided based on the maximum supported memory size allowed and available in the radio device and in the RAN node. The radio device may signal to the RAN node (e.g. RNC or eNB) that it support the compression feature and reports the largest size of the compressor memory that it can support (other, smaller, memory buffer sizes may also be supported) using e.g. radio resource control (RRC) signaling. The RAN node may then decide based on its available memory resources which size of the compressor and de-compressor memory to use. The size of the compressor and de-compressor memory that will be used may be decided by the RAN but may not be larger than the size the radio device reported during RRC establishment (e.g. min (max (RAN node), max (radio device))).

However, it may not always be optimal that the memory is allocated with a fixed size and that it remains allocated as long as the compression feature is activated on the PS RAB. It may be that the volume and type of data traffic that the radio device generates at a specific moment instead would benefit from a larger memory size in order to increase the compression gain. On the other hand, it could be the opposite way, that too large a memory size is occupied and that the maximum compression gain could be achieved also with a smaller memory size. Then, a smaller compression and de-compression memory could be allocated and memory resources could be freed and used for another purpose. Alternatively, the memory size might be forced to decrease due to a changed load situation, e.g. more RABs being set up and the RAN node runs out of memory, e.g. if a very large memory once has been configured to one or more radio devices (e.g. in accordance with embodiments of the present disclosure).

FIG. 1 schematically shows an embodiment of a communication network 1 in accordance with the present disclosure. The communication network 1 comprises a radio access network (RAN) 2, such as a Universal Terrestrial Radio Access Network (UTRAN) or Evolved Universal Terrestrial Radio Access (E-UTRA). The RAN 2 comprises a base station (BS) 3, e.g. a Node B in accordance with a WCDMA communication standard or an eNB in accordance with an LTE communication standard. In some cases, the RAN 2 also comprises a controller 4, such as a radio network controller (RNC) of WCDMA, or the control function is integrated in the BS 3 such as in accordance with LTE. The RAN 2 is connected to a core network (CN) 6 of an operator in the communication network 1, e.g. via a public network such as the Internet. The RAN 2 serves one or more radio devices 5 in the communication network 1, providing a data connection for said radio devices 5 via a radio bearer (RB) 8 of a PS RAB(s) 7, the RAB 7 being defined between the radio device 5 and the CN 6 while the RB 8 is defined between the radio device 5 and the RAN 2 (e.g. the RNC 4 in UMTS or the eNB in LTE). The radio device 5 may be any device or user equipment (UE), mobile or stationary, enabled to communicate over a RAB 7 in a communications network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 2:
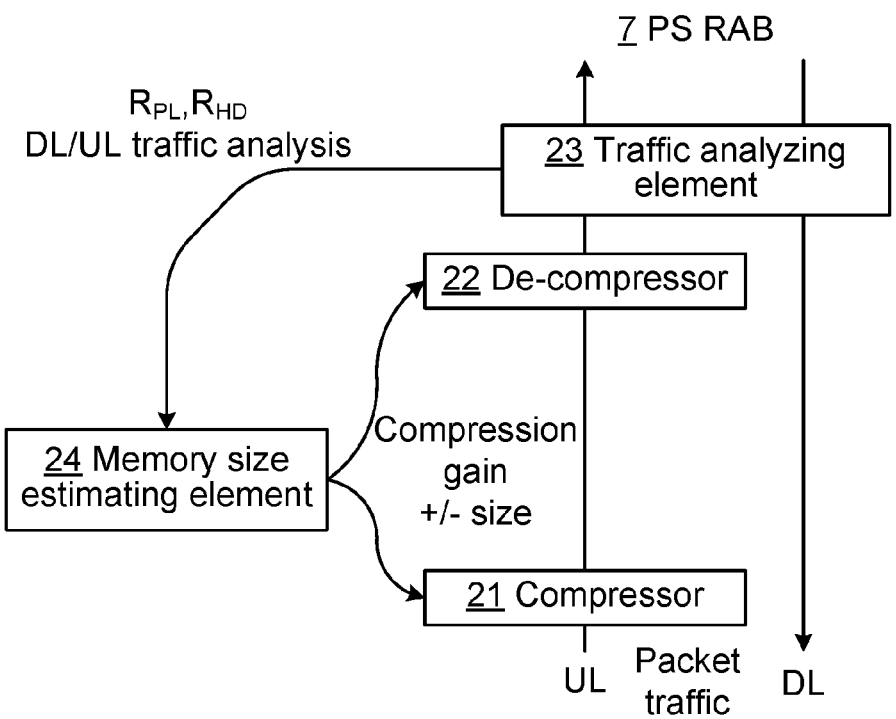
FIG. 2 is a schematic block diagram illustrating embodiments of compression in accordance with the present disclosure.

FIG. 2 schematically illustrates how the compression may function in UL in accordance with the present disclosure. In DL compression, the functions performed in the radio device are instead performed in the RAN, and vice versa. A PS RAB 7 carries UL and DL data traffic between a radio device 5 and a CN 6. For the UL, compression is used. Therefore, the radio device 5 comprises a compressor 21 and the RAN 2, e.g. the BS 3 or the controller 4, comprises a de-compressor 22. A traffic analyzing element 23 is configured to analyze the UL and/or DL data in the PS RAB 7. The traffic analyzing element 23 outputs information about the analysis to a memory size estimating element 24. The memory size estimating element 24 outputs information about its estimate to the radio device 5 and the RAN 2 for allowing them to adjust their compression memories of the compressor 21 and de-compressor 22, respectively. The traffic analyzing element 23 may be comprised in the radio device 5 and the memory size estimating element 24 may be comprised in the RAN 2, but the elements 23 and/or 24 may alternatively be located elsewhere in the communication network 1, for instance may both elements 23 and 24 be located in the radio device 5 or in the RAN 2.

At PS RAB 7 establishment, the initial size of the compressor 21 and de-compressor 22 memory may be set to a size that is based on the maximum supported memory size in the radio device 5 and in the RAN 2. The radio device may report a capability that indicates the maximum supported memory size to the RAN e.g. during radio resource control (RRC) establishment. The size of the compressor 21 and de-compressor 22 memory that shall be used may be decided in the RAN, e.g. in an RNC. It will typically never be larger than what the radio device reported as its maximum during RRC establishment.

The traffic analyzing element 23 may analyze the data traffic in both uplink and downlink. The element 23 may keep track of the fraction of all uplink data that consists of compressible payload ($R_{PL}$), and the fraction of all uplink data that consists of compressible headers ($R_{HD}$). It may also be possible to keep track of the intersection of the two.

To predict $R_{PL}$ and $R_{HD}$ for the next coming time period, e.g. data volumes, transport protocols, application layer protocols, service types and/or media types may be analyzed from knowledge about the history of past traffic, and/or real-time analysis of present traffic. The main analysis may be done on the traffic direction that is subject to compression, e.g. UL, but may alternatively or additionally include the opposite direction e.g. DL. For example, if applying data compression in the uplink, the main analysis is performed on the uplink traffic, but by analyzing also the downlink traffic, an estimate can be made about the number of packets with just a TCP acknowledgement that can be expected in uplink within the next timeframe. In case of a bi-directional data streams, it may be possible to predict the corresponding uplink data for those streams based on analysis of DL traffic. By analyzing the application layer signaling it may be possible to understand when the radio device 5 is setting up a connection to upload certain content. Both the compressible data/header ratios ($R_{PL}$ and $R_{HD}$, respectively) and the downlink traffic analysis are output from the traffic analyzing element 23.

The memory size estimating element 24 may use the output from the traffic analyzing element 23 to estimate the desired size of the memory of past data packets in the compressor 21 and the de-compressor 22. The desired size may be the size that results in the best possible compression gain for the type and volume of data that flows in UL from a particular radio device 5 relative to the cost of memory in both the radio device and the RAN 2.

As one example, consider uplink compression from a radio device 5 towards a RAN 2. If the traffic analyzing element 23 finds that none of the payload data running in the uplink direction is compressible, but all headers are, it may be beneficial to adapt the memory size to only compressing the headers. On the other hand, if also a certain fraction of the uplink payload is compressible, the optimal memory selection may consider both headers and that particular fraction of compressible payload data. By analyzing the downlink data traffic, it may also be possible to predict how much TCP acknowledgements will be transmitted in the uplink. These may then be considered as an increased fraction of headers.

The desired size of the memory of past packets may be distributed to the de-compressor 22 in RAN 2 and the compressor 21 in the radio device 5. From then on, both RAN and the radio device may start to use the desired size of the memory of past packets in their respective de-compressor and compressor algorithms.

In case the new desired memory size is smaller than what is presently used, there may be an issue with compressed packets that have been sent from the compressor 21 towards the de-compressor 22, but still not being de-compressed. These packets may have pointers towards any part of the buffer of the de-compressor memory, and abruptly decreasing the buffer size by decreasing the memory size may discard the data needed to recover these packets. To avoid such cases, the memory size may be changed as soon as either data levels have decreased to the new level or below, or the buffer is being flushed or re-established for some reason (could be e.g. RRC state change to UTRAN Registration Area (URA), handover or RAB re-establishment). The change may be valid for all new RAB establishments until a new value is calculated.

When the new desired memory size is larger than what is currently used, than the 'Memory of passed packets size estimator' can use the in-band L2 signaling to instruct the UE that it can start use the larger size of the memory of passed packets. In the L2 acknowledgement, the UE will confirm it starts using the new larger size of the memory of passed packets in the sequence number following the confirmation.

The traffic analyzing element 23 may be implemented in the radio device 5, nearby the compressor 21, but it could in some embodiments reside in RNC or in eNB (in case of LTE) additionally or alternatively. The memory size estimating element 24 may be located at the network side, in RNC or in eNB (in case of LTE).

In case the traffic analyzing element 23 is implemented in the radio device 5, the radio device may save the results from the traffic data analysis even when disconnecting the PS RAB 7 but as long as it is powered on. At next PS RAB 7 establishment, the traffic analyzing element 23 in the radio device may then be able to feed this information directly into the memory size estimating element 24. This may be realized by using the mechanism in RRC layer that enables the radio device to convey its capabilities in the radio device 5. The compressibility ratios and the data from the downlink traffic analysis may be sent to the RAN 2 (RNC 4/eNB 3) when the radio device 5 informs about its capability regarding UL compression. The memory size estimating element 24 may then be able to determine the desired size of the memory of past packets at PS RAB 7 establishment. The de-compressor 22 and compressor 21 may then be configured with the desired size of the memory of past packets immediately. The desired size of the memory of past packets may be forwarded to the radio device 5 as part of the in-band Layer 2 signaling that is used between the RAN 2 (RNC/eNB) and the radio device to activate/deactivate and configure the compression functionality.

Alternatively, the desired memory size may be stored directly in the radio device 5 when releasing a PS RAB 7, and used at next PS RAB establishment. The mechanism as described above may be used between the radio device 5 and RAN 2 to inform the memory size estimating element 24 about the latest used desired size of the memory of past packets. The de-compressor 22 and compressor 21 may then be configured with this size.

In case a connected radio device 5 establishes a second PS RAB 7, either a new (additional) traffic analyzing element 23 is allocated for this RAB 7 or the already existing traffic analyzing element 23 may be used. If a new traffic analyzing element 23 is to be allocated, it may initially be fed with parts of or all of the history of UL data and the actual type of data traffic that is being sent in UL available in the old new traffic analyzing element 23.

Figure 3A:
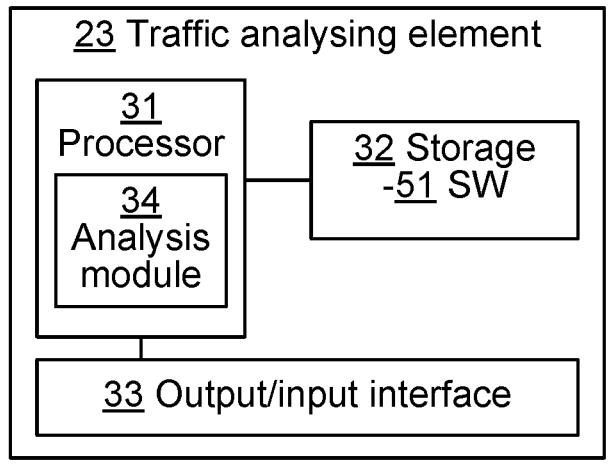
FIG. 3a is a schematic block diagram of an embodiment of a traffic analyzing element in accordance with the present disclosure.

FIG. 3a is a schematic illustration of an embodiment of the traffic analyzing element 23. The traffic analyzing element may e.g. be integrated in the radio device 5 or in a node in the RAN 2. The traffic analyzing element 23 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software stored in a storage 32 of one or several storage unit(s) e.g. a memory. The processing circuitry 31 and/or the storage 32 may be shared within a node in which the traffic analyzing element 23 is comprised. If e.g. the traffic analyzing element 23 is integrated in the radio device 5, the processor circuitry 31 and/or the storage 32 may be used also for other applications in the radio device 5. The storage unit 32 is regarded as a computer readable means as discussed herein and may e.g. be in the form of a Random Access Memory (RAM), a Flash memory or other solid state memory, or a hard disk, or be a combination thereof. The storage 32 may hold software (SW) 51 (see also FIG. 5), which when it is run on the processor circuitry 31 may result in an analysis module 34 for facilitating performing a method of the present disclosure. The processor circuitry 31 may also be configured to store data in the storage 32, as needed. The traffic analyzing element 23 also comprises an input/output interface 33, e.g. a communication interface, for outputting and receiving information, e.g. measurements. The traffic analyzing element 23 may be used for performing an embodiment of the method performed by a traffic analyzing element discussed herein.

Thus, according to an aspect of the present disclosure, there is provided a traffic analyzing element 23 for a communication network 1 in which a radio device 5 communicates over a PS RAB 7 with a RAN 2 using compression in UL. The traffic analyzing element comprises processor circuitry 31, and a storage unit 32 storing instructions 51 that, when executed by the processor circuitry 31, cause the traffic analyzing element 23 to measure at least one property of radio traffic between the radio device 5 and the RAN 2. The instructions 51 also cause the traffic analyzing element 23 to predict a fraction of UL data on the PS RAB 7 which will be compressible, based on the measuring. The instructions 51 also cause the traffic analyzing element 23 to output information about the predicted fraction to a memory size estimating element 24 in the communication network 1.

Figure 3B:
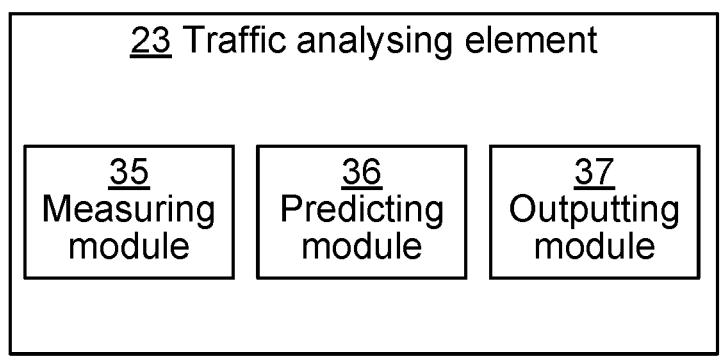
FIG. 3b is a schematic functional block diagram of an embodiment of a traffic analyzing element in accordance with the present disclosure.

FIG. 3b is a schematic block diagram functionally illustrating an embodiment of the traffic analyzing element 23 in FIG. 3a. As previously mentioned, the processor circuitry 31 may run software 51 for enabling the traffic analyzing element 23 to perform an embodiment of a method of the present disclosure, whereby functional modules may be formed in traffic analyzing element 23, e.g. in the processor circuitry 31 or (more specifically) in the analysis module 34, for performing the different steps of the method. These modules are schematically illustrated as blocks within the traffic analyzing element 23. Thus, the traffic analyzing element 23 comprises a measuring module 35 for measuring at least one property of radio traffic between the radio device 5 and the RAN 2. The traffic analyzing element 23 also comprises a predicting module 36 for predicting a fraction of UL data on the PS RAB 7 which will be compressible, based on the measuring. The traffic analyzing element 23 also comprises an outputting module 37 for outputting information about the predicted fraction to a memory size estimating element 24 in the communication network 1.

Figure 4A:
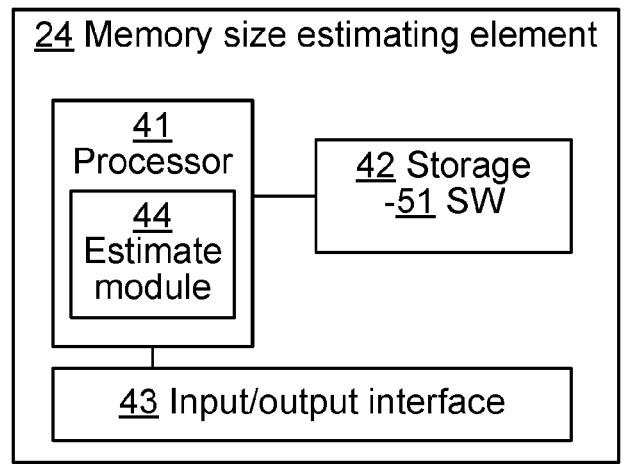
FIG. 4a is a schematic block diagram of an embodiment of a memory size estimating element in accordance with the present disclosure.

FIG. 4a is a schematic illustration of an embodiment of the memory size estimating element 24. The memory size estimating element 24 may e.g. be integrated in a node in the RAN 2. The memory size estimating element 24 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software stored in a storage 42 of one or several storage unit(s) e.g. a memory. The processing circuitry 41 and/or the storage 42 may be shared within a node in which the memory size estimating element 24 is comprised. If e.g. the memory size estimating element 24 is integrated in the RNC 4, the processor circuitry 41 and/or the storage 42 may be used also for other applications in the RNC 4. The storage unit 42 is regarded as a computer readable means as discussed herein and may e.g. be in the form of a Random Access Memory (RAM), a Flash memory or other solid state memory, or a hard disk, or be a combination thereof. The storage 42 may hold software (SW) 51 (see also FIG. 5), which when it is run on the processor circuitry 41 may result in an estimate module 44 for facilitating performing a method of the present disclosure. The processor circuitry 41 may also be configured to store data in the storage 42, as needed. The memory size estimating element 24 also comprises an input/output interface 43, e.g. a communication interface, for outputting and receiving information. The memory size estimating element 24 may be used for performing an embodiment of the method performed by a memory size estimating element discussed herein.

Thus, according to an aspect of the present disclosure, there is provided a memory size estimating element 24 for a communication network 1 in which a radio device 5 communicates over a PS RAB 7 with a RAN 2 using compression in UL. The memory size estimating element comprises processor circuitry 41, and a storage unit 42 storing instructions 51 that, when executed by the processor circuitry 41, cause the memory size estimating element 24 to receive, from a traffic analyzing element 23 in the communication network 1, information about a predicted fraction of UL data on the PS RAB 7 which will be compressible. The instructions 51 also cause the memory size estimating element 24 to estimate a memory size of a compressor memory and a de-compressor memory for storing past UL data packets transmitted over the PS RAB 7, based on the received information. The instructions 51 also cause the memory size estimating element 24 to output information about the estimated memory size to the compressor 21 and to the de-compressor 22, allowing the compressor and de-compressor to adjust their respective memory sizes to the estimated memory size.

Figure 4B:
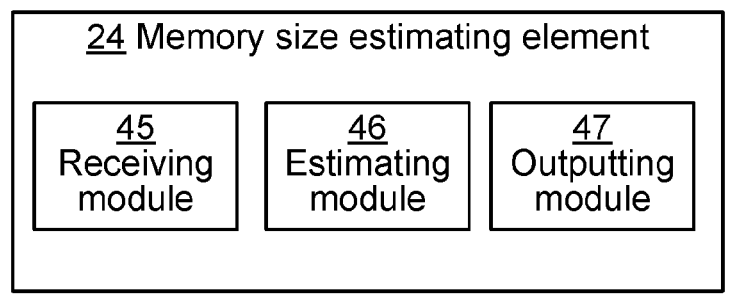
FIG. 4b is a schematic functional block diagram of an embodiment of a memory size estimating element in accordance with the present disclosure.

FIG. 4b is a schematic block diagram functionally illustrating an embodiment of the memory size estimating element 24 in FIG. 4a. As previously mentioned, the processor circuitry 41 may run software 51 for enabling the memory size estimating element 24 to perform an embodiment of a method of the present disclosure, whereby functional modules may be formed in memory size estimating element 24, e.g. in the processor circuitry 41 or (more specifically) in the estimate module 44, for performing the different steps of the method. These modules are schematically illustrated as blocks within the memory size estimating element 24. Thus, the memory size estimating element 24 comprises a receiving module 45 for receiving, from a traffic analyzing element 23 in the communication network 1, information about a predicted fraction of UL data on the PS RAB 7 which will be compressible. The memory size estimating element 24 also comprises an estimating module 46 for estimating a memory size of a compressor memory and a de-compressor memory for storing past UL data packets transmitted over the PS RAB 7, based on the received information. The memory size estimating element 24 also comprises an outputting module 47 for outputting information about the estimated memory size to the compressor 21 and to the de-compressor 22, allowing the compressor and de-compressor to adjust their respective memory sizes to the estimated memory size.

Figure 5:
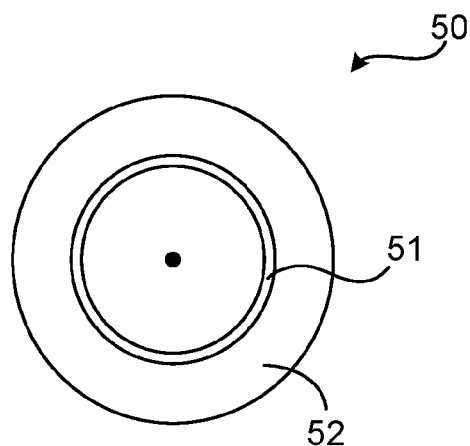
FIG. 5 is a schematic illustration of an embodiment of a computer program product in accordance with the present disclosure.

FIG. 5 illustrates a computer program product 50. The computer program product 50 comprises a computer readable medium 52 comprising a computer program 51 in the form of computer-executable components 51. The computer program/computer-executable components 51 may be configured to cause an element 23 or 24, e.g. as discussed herein, to perform an embodiment of a method of the present disclosure. The computer program/computer-executable components may be run on the processor circuitry 31 or 41 of the element for causing the element to perform the method. The computer program product 50 may e.g. be comprised in a storage unit or memory 32 or 42 comprised in the element and associated with the processor circuitry 31 or 41. Alternatively, the computer program product 50 may be, or be part of, a separate, e.g. mobile, storage means, such as a computer readable disc, e.g. CD or DVD or hard disc/drive, or a solid state storage medium, e.g. a RAM or Flash memory.

FIG. 6 is a schematic flow chart of an embodiment of a method performed by the traffic analyzing element 23 in the communication network 1 in which the radio device 5 communicates over a PS RAB 7 with the RAN 2 using compression in UL. At least one property of radio traffic between the radio device 5 and the RAN 2 is measured 61. Then, a fraction of UL data on the PS RAB which will be compressible is predicted 62, based on the measuring 61. Then, information about the predicted 62 fraction is outputted, e.g. sent, to the memory size estimating element 24 in the communication network 1.

FIG. 7 is a schematic flow chart of an embodiment of a method performed by the memory size estimating element 24 in the communication network 1 in which the radio device 5 communicates over a PS RAB 7 with the RAN 2 using compression in UL. Information (typically the information outputted 63 from the traffic analyzing element 23) about a predicted fraction of UL data on the PS RAB which will be compressible is received 71, from the traffic analyzing element 23 in the communication network 1. Then, a memory size of a compressor memory and a de-compressor memory for storing past UL data packets transmitted over the PS RAB 7 is estimated 72, based on the received 71 information. Then, information about the estimated 72 memory size is outputted, e.g. sent, to the compressor 21 and to the de-compressor 22, allowing the compressor and de-compressor to adjust their respective memory sizes to the estimated 72 memory size.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure, as defined by the appended claims. Although specific terms may be employed herein, they are used in a generic and descriptive sense only and not for purposes of limitation.

The invention claimed is:

1. A method performed by a traffic analyzing element in a communication network in which a radio device communicates over a packet switched (PS) radio access bearer (RAB) with a radio access network (RAN) using compression in uplink (UL), the method comprising:
   measuring at least one property of radio traffic on the PS RAB between the radio device and the RAN in downlink (DL), wherein the at least one property of the radio traffic is one or more of: data volume, transport protocol used, application layer protocol used, service type or media type in UL or DL for real-time or historical mobile radio traffic, and a property of the application layer signaling, and wherein the at least one property is measured to estimate a number of expected UL packets with an acknowledgement in a future time frame of the PS RAB communication;
   predicting a fraction of UL data on the PS RAB which will be compressible, based on the measuring; and
   outputting information about the predicted fraction to a memory size estimating element in the communication network.

2. The method of claim 1, wherein the fraction is a fraction of the UL data having compressible payload and/or UL data having compressible header.

3. The method of claim 1, wherein the traffic analyzing element is comprised in the radio device.

4. The method of claim 1, wherein the traffic analyzing element is comprised in a node of the RAN.

5. A traffic analyzing element for a communication network in which a radio device communicates over a packet switched (PS) radio access bearer (RAB) with a radio access network (RAN) using compression in uplink (UL), the traffic analyzing element comprising:
   processor circuitry; and
   a storage unit storing instructions that, when executed by the processor circuitry, cause the traffic analyzing element to:
      measure at least one property of radio traffic on the PS RAB between the radio device and the RAN in downlink (DL), wherein the at least one property of the radio traffic is one or more of: data volume, transport protocol used, application layer protocol used, service type or media type in UL or DL for real-time or historical mobile radio traffic, and a property of the application layer signaling, and wherein the at least one property is measured to estimate a number of expected UL packets with an acknowledgement in a future time frame of the PS RAB communication;
      predict a fraction of UL data on the PS RAB which will be compressible, based on the measuring; and
      output information about the predicted fraction to a memory size estimating element in the communication network.

6. A method performed by a memory size estimating element in a communication network in which a radio device communicates over a packet switched (PS) radio access bearer (RAB) with a radio access network (RAN) using compression in uplink (UL), the method comprising:
   receiving, from a traffic analyzing element in the communication network, information about a predicted fraction of UL data on the PS RAB which will be compressible based on at least one property measured in downlink (DL), wherein the at least one property of the radio traffic is one or more of: data volume, transport protocol used, application layer protocol used, service type or media type in UL or DL for real-time or historical mobile radio traffic, and a property of the application layer signaling, and wherein the at least one property is measured to estimate a number of expected UL packets with an acknowledgement in a future time frame of the PS RAB communication;
   estimating a memory size of a compressor memory and a de-compressor memory for storing past UL data packets transmitted over the PS RAB, based on the received information; and
   outputting information about the estimated memory size to the compressor and to the de-compressor.

7. The method of claim 6, wherein the estimating a memory size comprises a trade-off between the highest compression gain obtainable and the availability of memory resources for the compressor and de-compressor.

8. The method of claim 6, wherein the memory size estimating element is comprised in the radio device.

9. The method of claim 6, wherein the memory size estimating element is comprised in a node of the RAN.

10. A memory size estimating element for a communication network in which a radio device communicates over a packet switched (PS) radio access bearer (RAB) with a radio access network (RAN) using compression in uplink (UL), the memory size estimating element comprising:
    processor circuitry; and
    a storage unit storing instructions that, when executed by the processor circuitry, cause the memory size estimating element to:
       receive, from a traffic analyzing element in the communication network, information about a predicted fraction of UL data on the PS RAB which will be compressible based on at least one property measured in downlink (DL), wherein the at least one property of the radio traffic is one or more of: data volume, transport protocol used, application layer protocol used, service type or media type in UL or DL for real-time or historical mobile radio traffic, and a property of the application layer signaling, and wherein the at least one property is measured to estimate a number of expected UL packets with an acknowledgement in a future time frame of the PS RAB communication;
       estimate a memory size of a compressor memory and a de-compressor memory for storing past UL data packets transmitted over the PS RAB, based on the received information; and
       output information about the estimated memory size to the compressor and to the de-compressor.

11. A non-transitory computer readable medium comprising computer program code which, when run on processor circuitry of a traffic analyzing element in a communication network, causes the traffic analyzing element to:
    measure at least one property of radio traffic on a packet switched (PS) radio access bearer (RAB) between a radio device and a radio access network (RAN) in the communication network, wherein the at least one property is measured in downlink (DL), wherein the at least one property of the radio traffic is one or more of: data volume, transport protocol used, application layer protocol used, service type or media type in UL or DL for real-time or historical mobile radio traffic, and a property of the application layer signaling, and wherein the at least one property is measured to estimate a number of expected UL packets with an acknowledgement in a future time frame of the PS RAB communication;

predict a fraction of uplink (UL) data on the PS RAB over which the radio device communicates with the RAN which will be compressible, based on the measuring; and output information about the predicted fraction to a memory size estimating element in the communication network.

12. A non-transitory computer readable medium comprising computer program code which, when run on processor circuitry of a memory size estimating element in a communication network, causes the memory size estimating element to:

receive, from a traffic analyzing element in the communication network, information about a predicted fraction of uplink (UL) data on a packet switched (PS) radio access bearer (RAB) over which a radio device communicates with a radio access network (RAN) in the communication network, which will be compressible based on at least one property measured in downlink (DL), wherein the at least one property of the radio traffic is one or more of: data volume, transport protocol used, application layer protocol used, service type or media type in UL or DL for real-time or historical mobile radio traffic, and a property of the application layer signaling, and wherein the at least one property is measured to estimate a number of expected UL packets with an acknowledgement in a future time frame of the PS RAB communication;

estimate a memory size of a compressor memory and a de-compressor memory for storing past UL data packets transmitted over the PS RAB, based on the received information; and output information about the estimated memory size to the compressor and to the de-compressor.

* * * * *